United States Patent
Hatanaka et al.

(10) Patent No.: US 7,560,919 B2
(45) Date of Patent: Jul. 14, 2009

(54) ROTATION ANGLE USING ORTHOGONAL MAGNETIC SENSING ELEMENTS IN CLOSE PROXIMITY TO EACH OTHER

(75) Inventors: Shinji Hatanaka, Okazaki (JP); Kenji Takeda, Okazaki (JP); Tsutomu Nakamura, Kariya (JP); Osamu Shimomura, Okazaki (JP); Takashi Kawashima, Nagoya (JP); Koichiro Matsumoto, Kariya (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 0 days.

(21) Appl. No.: 11/529,298

(22) Filed: Sep. 29, 2006

(65) Prior Publication Data

US 2007/0069719 A1    Mar. 29, 2007

(30) Foreign Application Priority Data

Sep. 29, 2005   (JP) .............................. 2005-283939

(51) Int. Cl.
  *G01B 7/30* (2006.01)
(52) U.S. Cl. ............................. 324/207.25; 324/207.21; 324/207.2
(58) Field of Classification Search ............ 324/207.25, 324/207.2, 207.21, 207.14, 207.23, 173, 324/174, 179; 33/1 N, 1 PT
See application file for complete search history.

(56) References Cited

U.S. PATENT DOCUMENTS

| | | | | |
|---|---|---|---|---|
| 2,911,538 | A | * 11/1959 | Munz | .......................... 250/204 |
| 3,194,990 | A | * 7/1965 | Kendall | ....................... 310/10 |
| 5,528,139 | A | 6/1996 | Oudet et al. | |
| 5,789,917 | A | 8/1998 | Oudet et al. | |
| 6,043,645 | A | 3/2000 | Oudet et al. | |
| 6,479,987 | B1 | * 11/2002 | Marx et al. | .............. 324/207.2 |
| 2004/0164733 | A1 | 8/2004 | Fukaya et al. | |
| 2005/0024045 | A1* | 2/2005 | Hagino et al. | .......... 324/207.25 |
| 2005/0104581 | A1* | 5/2005 | Miyata et al. | .......... 324/207.25 |
| 2006/0208727 | A1* | 9/2006 | Matsumoto et al. | .... 324/207.25 |

* cited by examiner

*Primary Examiner*—Patrick J Assouad
*Assistant Examiner*—David M. Schindler
(74) *Attorney, Agent, or Firm*—Nixon & Vanderhye, PC

(57) ABSTRACT

A rotation angle detecting device that detects a rotation angle of a rotating object includes a permanent magnet that generates magnetic fields in response to rotation of the rotating object, a magnetic sensor, a first yoke and a second yoke. The magnetic sensor includes a pair of close integrated magnetic sensing elements, such as hall elements, disposed at a position around the permanent magnet so that one of the sensing elements senses magnetic field at a phase different from the other. The first yoke and the second yoke forms two magnetic paths crossing each other at the magnetic sensor.

20 Claims, 7 Drawing Sheets

ROTATION ANGLE USING ORTHOGONAL MAGNETIC SENSING ELEMENTS IN CLOSE PROXIMITY TO EACH OTHER

CROSS REFERENCE TO RELATED APPLICATION

The present application is based on and claims priority from Japanese Patent Application 2005-283939, filed Sep. 29, 2005, the contents of which are incorporated herein by reference.

BACKGROUND OF THE INVENTION

1. Field of the Invention

The present invention relates to a rotation angle detecting device that detects a rotation angle of an rotating object.

2. Description of the Related Art

Usually, a rotation angle of a rotating object is detected by a rotation angle detecting device that is constituted of a permanent magnet rotor linked with the rotating object, a pair of magnetic sensing elements that are respectively disposed around the permanent magnet rotor to be spaced apart from each other in the rotating direction, as disclosed in JP-A-2004-271495 or, its counterpart, US 2004/0164733 A1. When the rotating object rotates, the magnetic sensing elements detect a change in a magnetic field that is generated by the permanent magnet rotor, thereby providing signals relating to the rotation angle of the rotation object.

Because the magnetic sensing elements are spaced apart in the rotating direction, it is difficult to accurately position the magnetic sensing elements. In other words, the angle formed between two magnetic sensing elements may not be a desired angle, the setting directions of two magnetic sensing elements may not be desired directions, or temperature difference between two magnetic sensing elements may arise. As a result, the magnetic sensing elements may generate signals that may cause an error in the rotation angle to be detected.

SUMMARY OF THE INVENTION

Therefore, an object of the invention is to provide an improved rotation angle detecting device that can accurately detect the rotation angle of a rotating object.

Another object of the invention is to provide a new structure in which a pair of magnetic sensing elements is integrated into a single unit.

According to a feature of the invention, a rotation angle detecting device includes field means for generating magnetic fields in response to rotation of a rotating object, a magnetic sensor including at least a pair of close integrated magnetic sensing elements disposed at a position around the field means so that one of the sensing elements senses magnetic field at a phase different from the other; and yoke means disposed around the field means for forming two magnetic paths crossing each other at the magnetic sensor.

Because the two magnetic sensing elements are disposed very close to each other, it is possible to integrate them into a unit, so that the angle between the two elements and the setting directions thereof may be accurately formed. In addition, there is little temperature difference between two hall elements.

In the above rotation angle detecting device, the magnetic sensor is preferably formed on a chip. The yoke means may include a plurality of first yokes disposed in a circumferential direction at gaps to form a first magnetic path and a second yoke disposed around the inner yokes to form a second magnetic path crossing the first magnetic path at one of the gaps, and the magnetic sensor is disposed in one of the gaps. The second yoke may have a projection projecting toward the magnetic sensor. Each of the gaps may have the same distance.

Further, the above rotation angle detecting device may include another magnetic sensor that also includes a pair of close integrated magnetic sensing elements disposed at another position around the field means. One of the sensing elements is preferably disposed at an angle of 90 degrees to the other.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

The present invention will be described with reference to the appended drawings.

A rotation angle detecting device according to the first embodiment of the invention will be described with reference to FIGS. 1A-3.

Figure 1A:
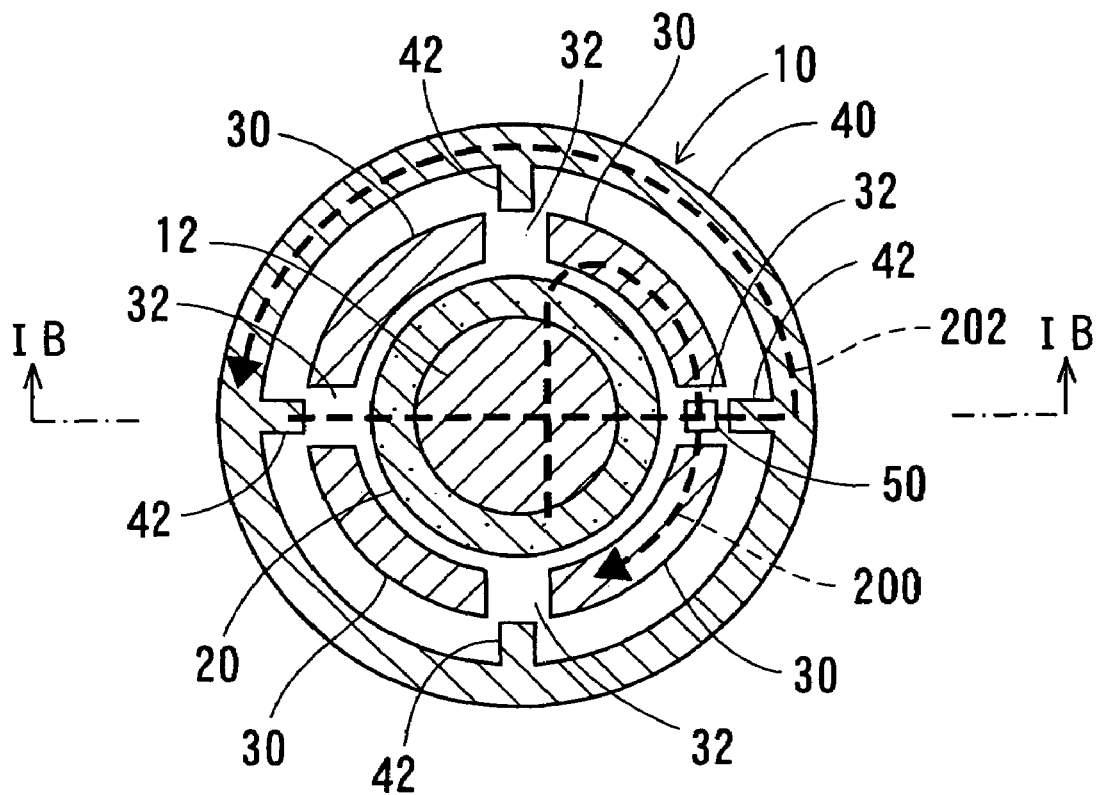
FIG. 1A is a cross-sectional plan view of a rotation angle detecting device according to the first embodiment of the invention.
Figure 1B:
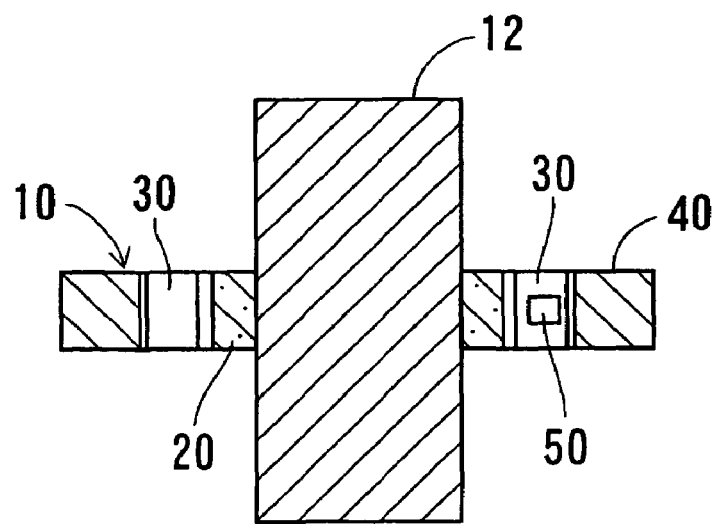
Fig. 1B is a cross-sectional longitudinal view of the rotation angle detecting device according to the first embodiment cut along one-dot-chain line B-B in FIG. 1A.

As shown in FIGS. 1A and 1B, a rotation angle detecting device 10 is set around a rotary shaft 12 that is linked with a rotating object (not shown). The rotation angle detecting device 10 is constituted of a ring-shaped permanent magnet 20, four arc-shaped magnetic inner yokes 30, a generally cylindrical magnetic outer yoke 40 and a magnetic sensor 50.

The ring-shaped permanent magnet 20 is magnetized to polarize in parallel with a radial direction thereof and fixed to the circumference of the rotary shaft 12. The four inner yokes 30 are disposed around the permanent magnet 20 at equal intervals so that gaps 32 can be formed at intervals of 90 degrees. In other words, each of the gaps 32 is positioned around the permanent magnet 20 opposite to, or at 180 degrees from, another of the gaps 32. The cylindrical outer yoke 40 is disposed around the inner yokes 30. The outer yoke 40 has four projections 42 each of which projects toward one of the gaps 32.

Figure 2:
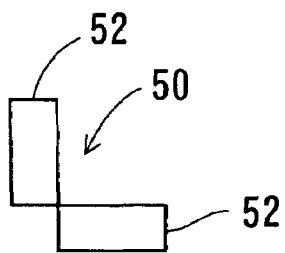
FIG. 2 is a schematic diagram illustrating a magnetic sensor unit.

The magnetic sensor 50 is a one-chip semiconductor element, which is disposed in one of the gaps 32 so as to confront one of the projections 42 and side surfaces of the inner yokes 30 that sandwich the magnetic sensor 50. As shown in FIG. 2, the magnetic sensor 50 is constituted of a pair of Hall elements 52 that are disposed perpendicular to each other to respectively sense magnetic flux densities of the magnetic field in directions perpendicular to each other, thereby detecting the direction of a composite magnetic field. In other words, the two Hall elements 52 are disposed very close to each other. Accordingly, the angle of 90 degrees between the two Hall elements 52, and the setting directions thereof may be accurately formed. In addition, there is little temperature difference between two Hall elements.

The inner yokes 30 and the outer yoke 40 with one of the projections confronting the magnetic sensor 50 form magnetic paths 200, 202 to cross each other at the sensor 50 at an angle of 90 degrees, as illustrated by broken lines.

Figure 3:
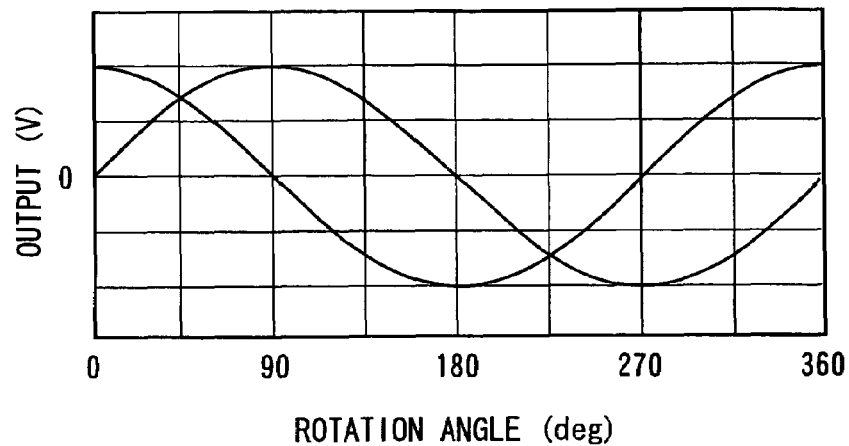
FIG. 3 is a graph showing a relationship between the rotation angle of the rotating object and the output signal of the magnetic sensor unit.

When a rotating object rotates and the rotary shaft 12 with the permanent magnet 20 rotates, the pair of hall elements 52 of the magnetic sensor 50 senses magnetic flux densities in the magnetic paths 200, 202 and provides output signals, which are a sine voltage signal and a cosine voltage signal, as shown in FIG. 3.

Assuming that: the rotation angle is θ; the output signals of the magnetic sensor are Va, Vb; a coefficient that relates to the sensitivity of the magnetic sensor is k; the magnetic flux density of the composite magnetic field is B; and an amount of current supplied to the hall elements is I, the output signals Va, Vb and the rotation angle θ can be expressed as follows.

$$Va = kBI \sin \theta \quad (1)$$

$$Vb = kBI \sin(\theta + 90) = kBI \cos \theta \quad (2)$$

$$Va/Vb = \sin \theta / \cos \theta = \tan \theta \quad (3)$$

$$\theta = \arctan(Va/Vb) \quad (4)$$

Thus, the rotation angle θ of the rotating object can be accurately detected.

A rotation angle detecting device 60 according to the second embodiment will be described with reference to FIG. 4. Incidentally, the same reference numeral indicates the same or substantially the same part, portion or component hereafter.

Figure 4:
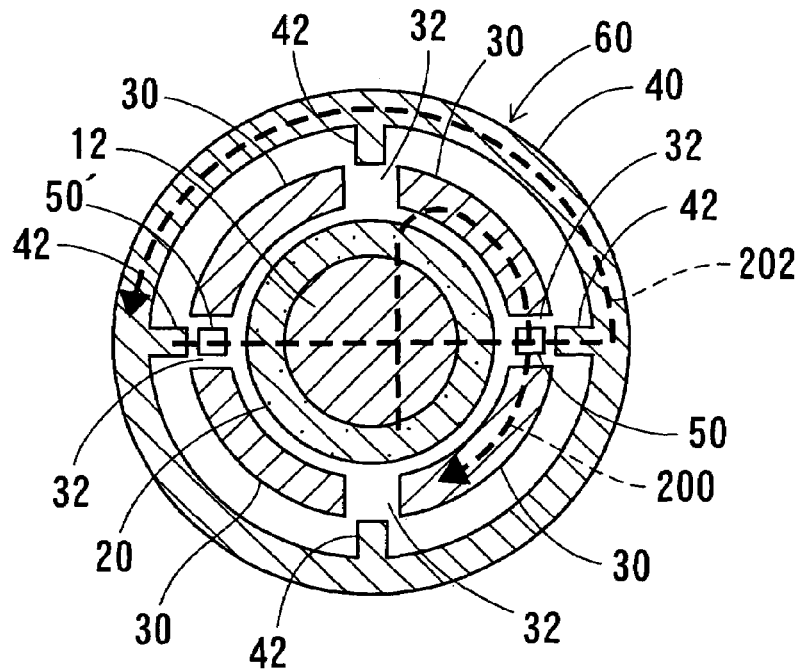
FIG. 4 is a cross-sectional plan view of a rotation angle detecting device according to the second embodiment of the invention.

As shown in FIG. 4, one more magnetic sensor 50' is disposed in another gap 32 that is located 180 degrees from the first magnetic sensor 50. With this additional magnetic sensor 50', a variation in the output signal of each of the magnetic sensors 50, 50' can be easily corrected by combining the output signals of both magnetic sensor 50 and the magnetic sensor 50'. The additional magnetic sensor may be disposed in a gap other than 180 degrees from the first magnetic sensor 50. Two or more additional sensors may be also used.

Figure 5:
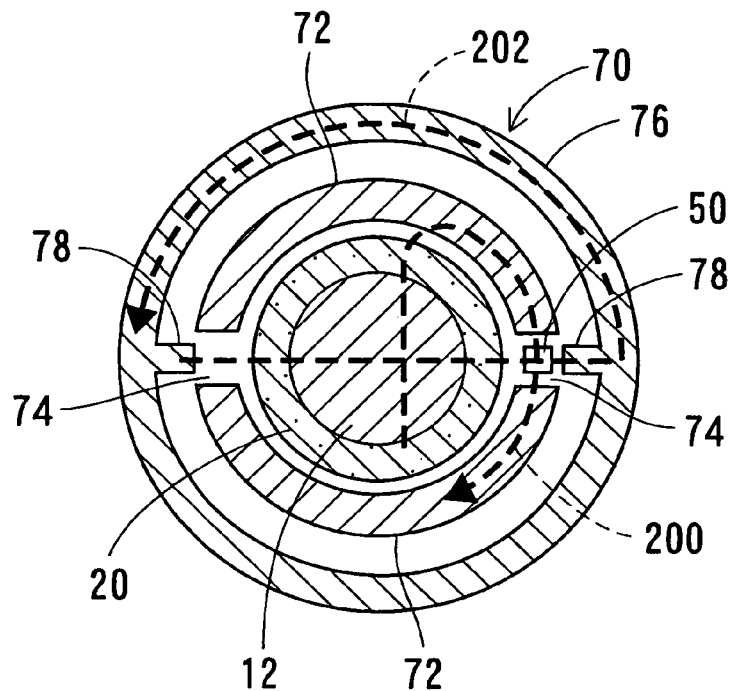
FIG. 5 is a cross-sectional plan view of a rotation angle detecting device according to the third embodiment of the invention.

A rotation angle detecting device 70 according to the third embodiment will be described with reference to FIG. 5.

The rotation angle detecting device 70 is constituted of two pieces of arc-shaped inner yokes 72 and an outer yoke 76 having two projections 78 to provide a pair of gaps 74 so as to be positioned around the permanent magnet 20 opposite to, or at 180 degrees from, the other, instead of four pieces of arc-shaped inner yokes 30 of the first embodiment and the outer yoke 40 having four projections 42 thereof. The inner yokes 72 and the outer yoke 76 with one of the projections 78 confronting the magnetic sensor 50 form magnetic paths 200, 202 to cross each other at the sensor 50 at an angle of 90 degrees, as illustrated by broken lines.

It is easier to assemble the inner yokes 72 than the first embodiment.

Figure 6:
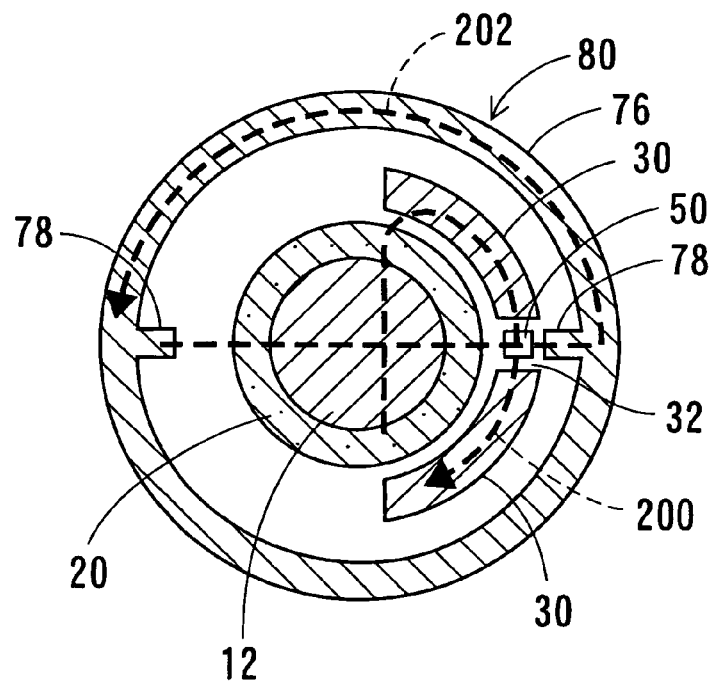
FIG. 6 is a cross-sectional plan view of a rotation angle detecting device according to the fourth embodiment of the invention.

A rotation angle detecting device 80 according to the fourth embodiment will be described with reference to FIG. 6.

The rotation angle detecting device 80 is constituted of two pieces of arc-shaped inner yokes 30, each of which is the same as the inner yoke 30 of the first embodiment and an outer yoke 76 having two projections 78 to provide a gap 32 so as to be positioned around the permanent magnet 20 opposite to, or at 180 degrees from, the other. The inner yokes 30 and the outer yoke 76 with one of the projections 78 confronting the magnetic sensor 50 form magnetic paths 200, 202 to cross each other at the sensor 50 at an angle of 90 degrees, as illustrated by broken lines.

It is also easier to assemble the inner yokes 30 than the first embodiment.

Figure 7:
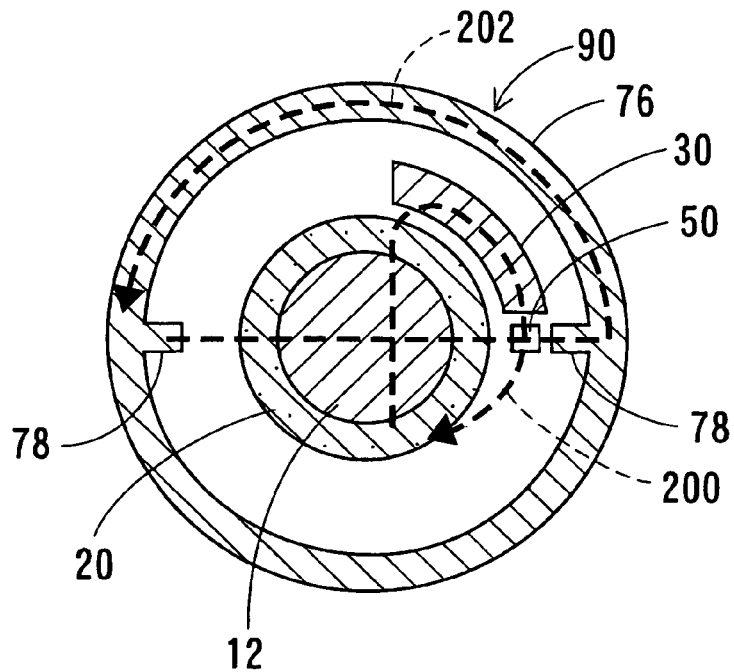
FIG. 7 is a cross-sectional plan view of a rotation angle detecting device according to the fifth embodiment of the invention.

A rotation angle detecting device 90 according to the fifth embodiment will be described with reference to FIG. 7.

The rotation angle detecting device 90 is constituted of a single piece of arc-shaped inner yoke 30 which is the same as the inner yoke 30 of the first embodiment and an outer yoke 76 having two projections 78 so as to be positioned around the permanent magnet 20 opposite to, or at 180 degrees from, the other. The inner yoke 30 and the outer yoke 76 with one of the projections 78 confronting the magnetic sensor 50 form magnetic paths 200, 202 to cross each other at the sensor 50 at an angle of 90 degrees, as illustrated by broken lines.

It is much easier to assemble the inner yokes 30 than the first embodiment.

Figure 8:
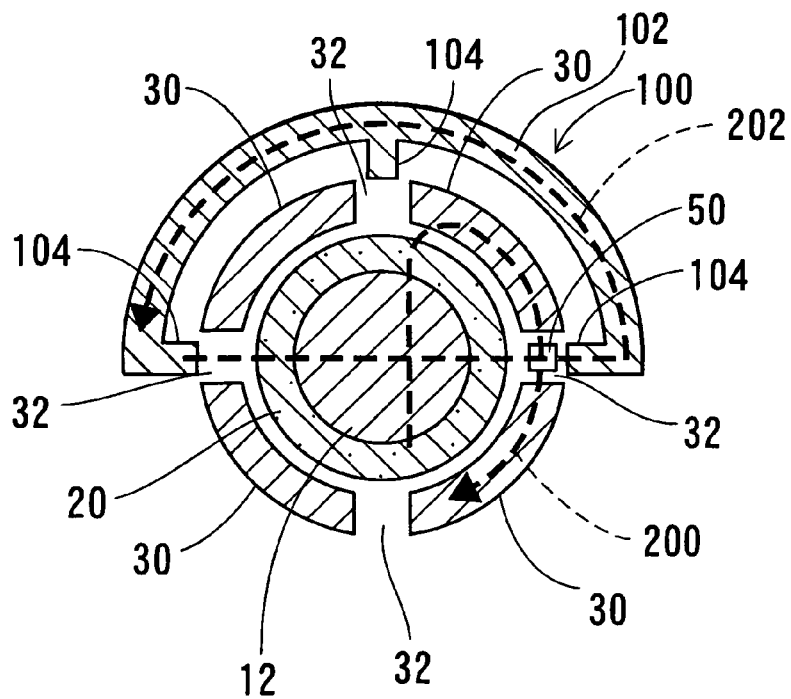
FIG. 8 is a cross-sectional plan view of a rotation angle detecting device according to the sixth embodiment of the invention.

A rotation angle detecting device 100 according to the sixth embodiment will be described with reference to FIG. 8.

The rotation angle detecting device 100 is constituted of four pieces of arc-shaped inner yokes 30 to provide four gaps 32 and a semi-cylindrical outer yoke 102 having three projections 104 positioned around the permanent magnet 20 at intervals of 90 degrees, instead of the cylindrical outer yoke 40 having four projections 42. The inner yokes 30 and the outer yoke 102 with one of the projections 104 confronting the magnetic sensor 50 form magnetic paths 200, 202 to cross each other at the sensor 50 at an angle of 90 degrees, as illustrated by broken lines.

Figure 9A:
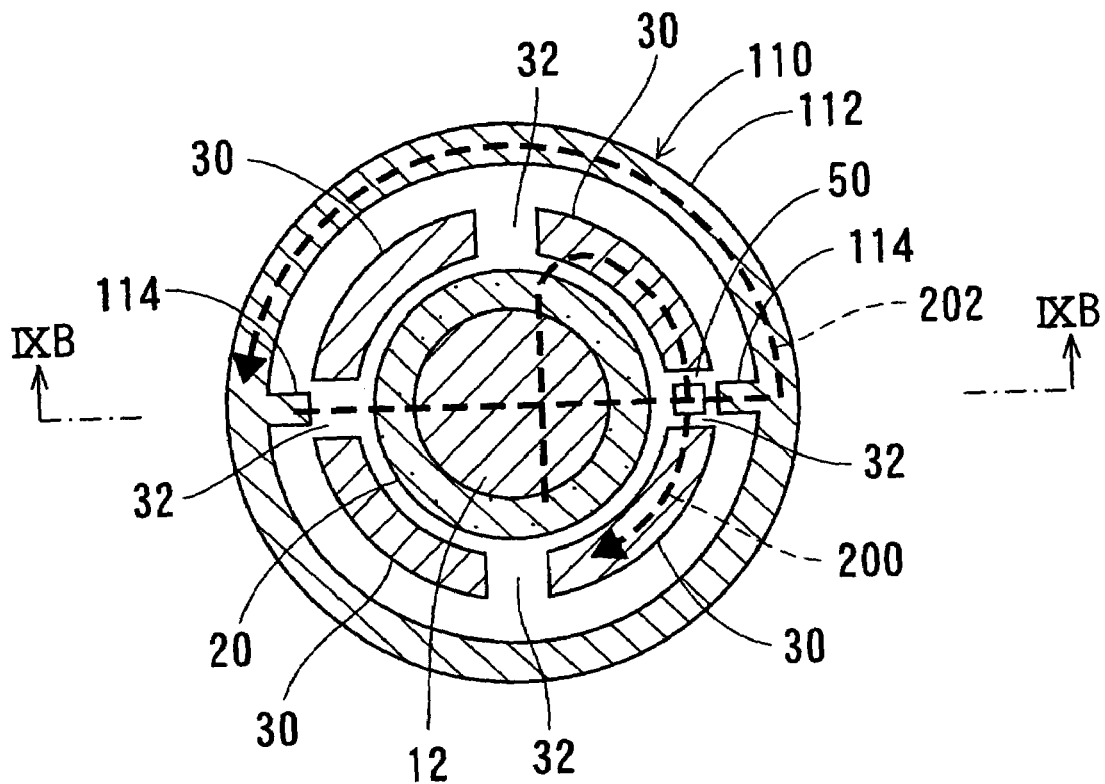
FIG. 9A is a cross-sectional plan view of a rotation angle detecting device according to the seventh embodiment of the invention.
Figure 9B:
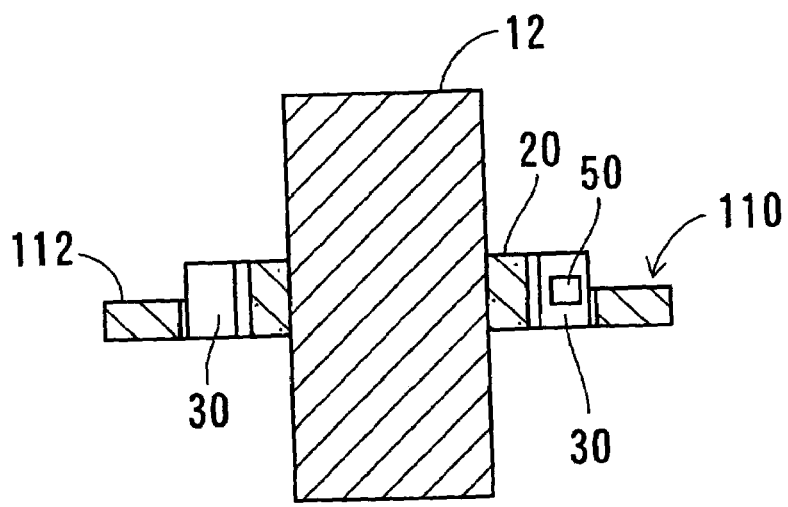
FIG. 9B is a cross-sectional longitudinal view of the rotation angle detecting device according to the seventh embodiment cut along one-dot-chain line B-B in FIG. 9A.

A rotation angle detecting device 110 according to the seventh embodiment will be described with reference to FIGS. 9A and 9B.

The rotation angle detecting device 110 is constituted of four pieces of arc-shaped inner yokes 30 to provide four gaps 32 and a cylindrical outer yoke 112 having a pair of projections 114 positioned around the permanent magnet 20 at intervals of 180 degrees. The inner yokes 30 and the outer yoke 112 with one of the projections 114 confronting the magnetic sensor 50 form magnetic paths 200, 202 to cross each other at the sensor 50 at an angle of 90 degrees, as illustrated by broken lines in FIG. 9A. The outer yoke 112 is made thinner than the inner yokes 30 to accommodate lead wires extending from the magnetic sensor 50, as shown in FIG. 9B.

Figure 10:
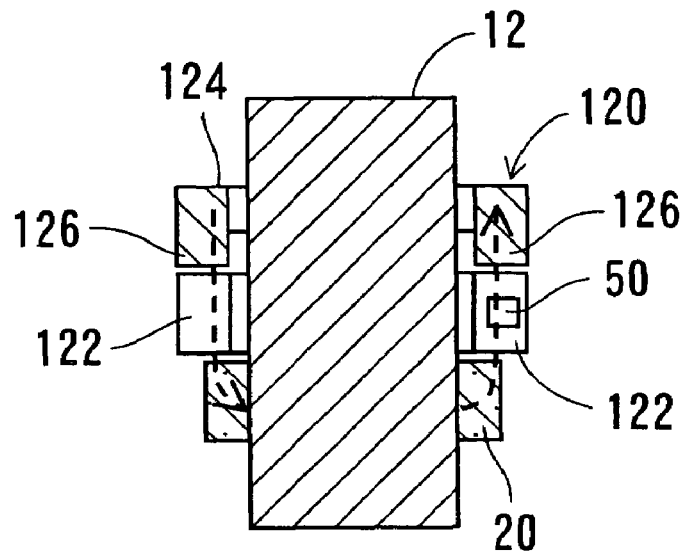
FIG. 10 is a cross-sectional longitudinal view of a rotation angle detecting device according to the eighth embodiment of the invention.

A rotation angle detecting device 120 according to the eighth embodiment will be described with reference to FIG. 10.

The rotation angle detecting device 120 is constituted of four pieces of arc-shaped first yokes 122 positioned at a side of the permanent magnet 20 at intervals of 90 degrees to provide four gaps and a cylindrical second yoke 124 disposed at the side of the first yokes opposite the permanent magnet 20. The second yoke has four projections 126 axially extending toward the gaps of the first yokes 122 at intervals of 90 degrees. The first yokes 122 and the second yoke 126 with one of the projections 126 confronting the magnetic sensor 50 form magnetic paths to cross each other at the sensor 50 at an angle of 90 degrees.

Because the first and the second yokes are axially shifted from the permanent magnet 20, the outside diameter of rotation angle detecting device can be reduced.

Figure 11:
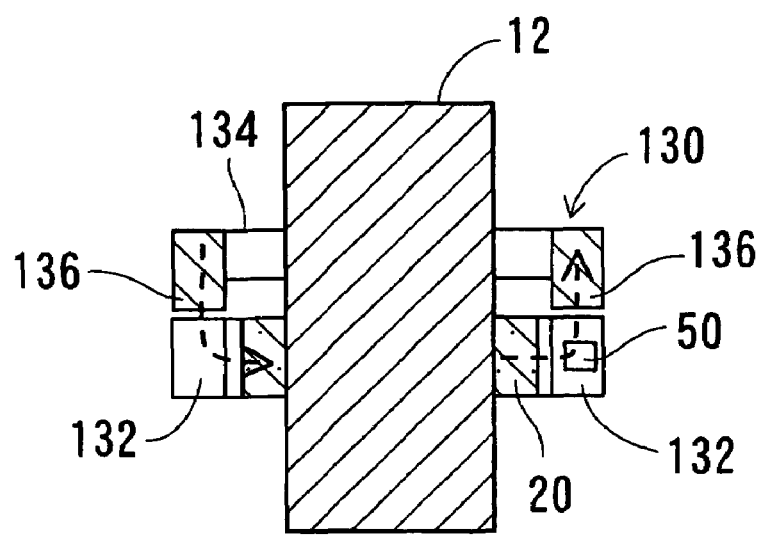
FIG. 11 is a cross-sectional longitudinal view of a rotation angle detecting device according to the ninth embodiment of the invention.

A rotation angle detecting device 130 according to the ninth embodiment will be described with reference to FIG. 11.

The rotation angle detecting device 130 is constituted of four pieces of arc-shaped first yokes 132 positioned around the permanent magnet 20 at intervals of 90 degrees to provide four gaps and a cylindrical second yoke 134 disposed at a side of the first yokes 132. The second yoke 134 has four projections 136 axially extending toward the gaps of the first yokes 132 at intervals of 90 degrees. The first yokes 132 and the second yoke 134 with one of the projections 136 confronting the magnetic sensor 50 form magnetic paths to cross each other at the sensor 50 at an angle of 90 degrees.

Because the second yokes are axially shifted from the permanent magnet 20, the outside diameter of rotation angle detecting device can be reduced.

Figure 12:
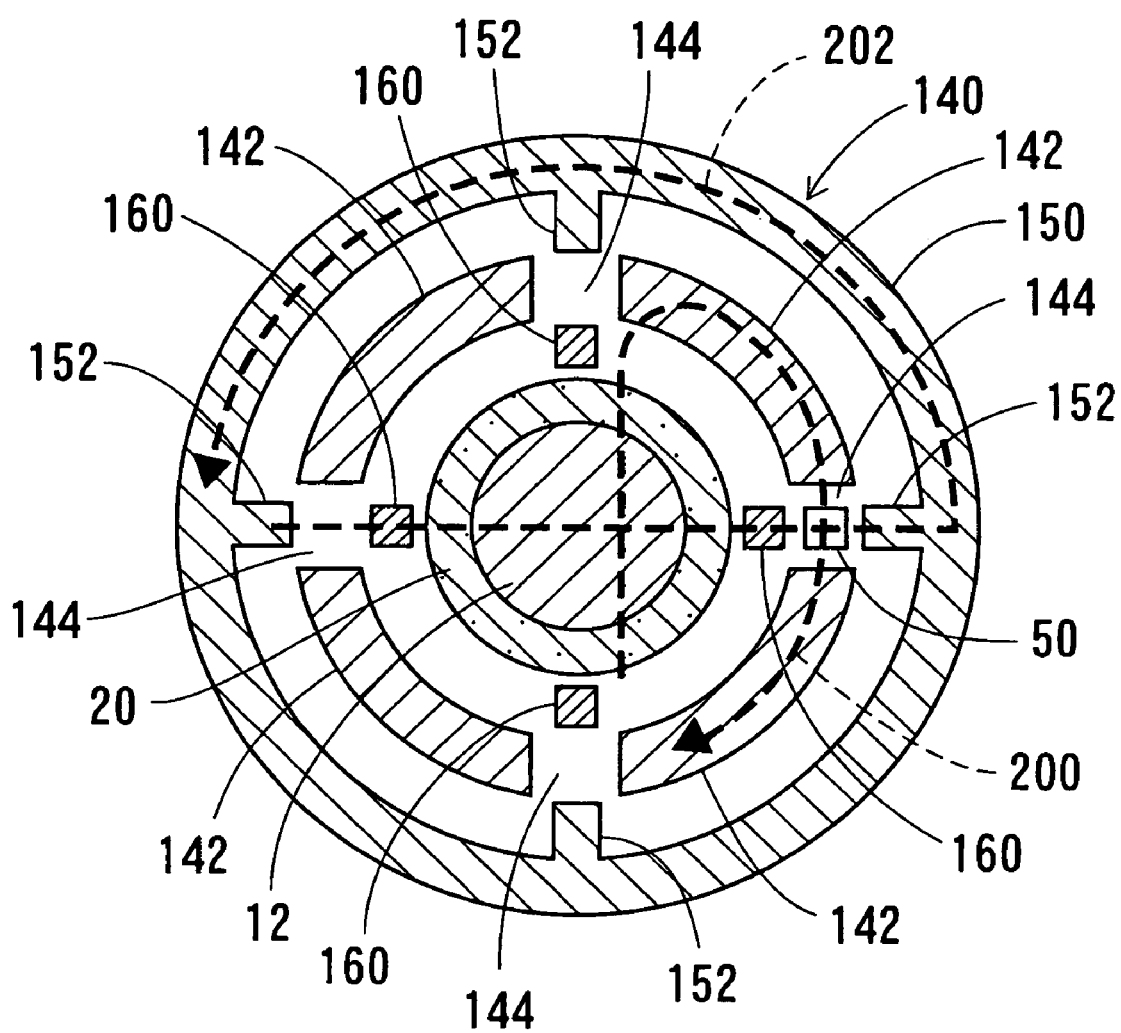
FIG. 12 is a cross-sectional plan view of a rotation angle detecting device according to the tenth embodiment of the invention.

A rotation angle detecting device 140 according to the tenth embodiment will be described with reference to FIG. 12.

The rotation angle detecting device 140 is constituted of four pieces of arc-shaped inner yokes 142 positioned around the permanent magnet 20 at intervals of 90 degrees to provide four gaps 144, four auxiliary yokes 160 disposed between the permanent magnet 20 and the inner yokes 142 to confront to one of the gaps 144 and a cylindrical outer yoke 150 disposed around the inner yokes 142. The outer yoke 150 has four projections 152 axially extending toward the gaps of the inner yokes 142 at intervals of 90 degrees. The inner yokes 142, the outer yoke 150 with one of the projections 152 confronting the magnetic sensor 50 and one a pair of auxiliary yokes 160 form magnetic paths 200, 202 to cross each other at the sensor 50 at an angle of 90 degrees.

The auxiliary yokes 160 are effective to increase the strength of the magnetic field.

In the above embodiments, a pair of hall elements 52 are disposed in a chip of the magnetic sensor 50 at an angle of 90 degrees to each other. The angle may be changed to an angle other than 90 degrees. The magnetic sensor 50 can be constituted of three or more hall elements or magneto-resistance elements.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A rotation angle detecting device for detecting a rotation angle of a rotating object, said device comprising:
    field means for generating movement of magnetic fields in response to rotation of said rotating object;
    a magnetic sensor including at least a pair of integrated magnetic sensing elements disposed in close proximity to each other and at a position around said field means; and
    yoke means disposed around said field means for simultaneously forming two magnetic paths crossing each other at said magnetic sensor, wherein each one of said sensing elements of said pair is disposed to sense magnetic flux passing through a respective one of said magnetic paths.

2. A rotation angle detecting device as claimed in claim 1, wherein said magnetic sensor is formed on a chip.

3. A rotation angle detecting device as claimed in claim 1, wherein:
    said yoke means comprises a plurality of first yokes spaced from each other by gaps and disposed in a circumferential direction to form a first magnetic path and a second yoke disposed around said first yokes to form a second magnetic path crossing said first magnetic path at one of said gaps; and
    said magnetic sensor is disposed in said one of said gaps.

4. A rotation angle detecting device as claimed in claim 3, wherein said second yoke has a projection projecting toward said magnetic sensor.

5. A rotation angle detecting device as claimed in claim 4, wherein each of said gaps has the same dimension.

6. A rotation angle detecting device as claimed in claim 1 further comprising another magnetic sensor including at least a pair of integrated magnetic sensing elements in close proximity to each other and disposed at another position around said field means.

7. A rotation angle detecting device a claimed in claim 1, wherein one of said sensing elements is disposed at an angle of 90 degrees with respect to the other.

8. A rotation angle detecting device for detecting a rotation angle of a rotating object, said device comprising:
    a permanent magnet rotor polarized in a radial direction and linked with said rotating object;
    a magnetic sensor, disposed at a position around said permanent magnet rotor, including a pair of integrated magnetic sensing elements one of which senses magnetic flux in a circumferential direction and the other of which senses magnetic flux in a radial direction;
    a first yoke unit forming a circumferential magnetic path in which said magnetic sensor is disposed; and
    a second yoke unit forming a radial magnetic path in which said magnetic sensor is disposed, whereby the two magnetic paths cross each other at the magnetic sensor.

9. A rotation angle detecting device as claimed in claim 8, wherein:
    said first yoke unit comprises a plurality of arc-shaped first yokes spaced from each other by gaps and disposed in a circumferential direction;

said second yoke unit is disposed around said first yokes; and said magnetic sensor is disposed at one of said gaps.

10. A rotation angle detecting device as claimed in claim 9, wherein said second yoke has a projection projecting toward said magnetic sensor.

11. A rotation angle detecting device as claimed in claim 10, wherein each of said gaps has the same dimension.

12. A method for detecting a rotation angle of a rotating object, said method comprising:

providing field means for generating variable magnetic flux in response to rotation of said rotating object;

positioning at least one pair of magnetic sensing elements adjacent to each other and at a position around said field means; and simultaneously forming two magnetic paths for dividing said variable magnetic flux into two portions both of which pass through said position of said pair of magnetic sensing elements in directions different from each other, wherein each one of said sensing elements senses a respective one of said magnetic flux portions passing through a respective one of said magnetic paths.

13. A method as claimed in claim 12 wherein said magnetic sensing elements are formed on an integrated circuit chip.

14. A method as claimed in claim 12 wherein:

said forming step comprises providing a plurality of first yokes spaced from each other by gaps and disposed in a circumferential direction to form a first magnetic path and a second yoke disposed around said first yokes to form a second magnetic path crossing said first magnetic path at one of said gaps; and disposing said magnetic sensing elements at said one of said gaps.

15. A method as claimed in claim 14 wherein said second yoke has a projection projecting toward said magnetic sensing elements.

16. A method as claimed in claim 12 further comprising:

disposing another pair of magnetic sensing elements in close proximity to each other and at another position around said field means.

17. A method as claimed in claim 12 wherein one of said sensing elements is disposed at an angle of 90 degrees with respect to the other.

18. A method for detecting a rotation angle of a rotating object, said method comprising:

rotating a permanent magnet rotor polarized in a radial direction by linking said rotor with said rotating object, thereby providing movable magnetic flux;

disposing a magnetic sensor at a position around said permanent magnet rotor, said sensor including first and second magnetic sensing elements, one of which senses magnetic flux in a circumferential direction and the other of which senses magnetic flux in a radial direction;

forming a circumferential magnetic path in which said first magnetic sensing element is disposed to sense a portion of said movable magnet flux passing through said circumferential magnetic path; and simultaneously forming a radial magnetic path in which said second magnetic sensing element is disposed to sense another portion of said movable magnetic flux passing through said radial magnetic path, whereby said two magnetic paths cross each other at said magnetic sensor.

19. A method as claimed in claim 18 wherein:

said circumferential magnetic path comprises a plurality of arch-shaped first yokes spaced from each other by gaps and disposed in a circumferential direction;

said radial magnetic path is disposed around said first yokes; and said magnetic sensor is disposed at one of said gaps.

20. A method as claimed in claim 19 wherein said radial magnetic path includes a second yoke having a projection projecting toward said magnetic sensor.

* * * * *